M. KLOBUSIAK.
ANIMAL TRAP.
APPLICATION FILED DEC. 4, 1911.
1,027,854.
Patented May 28, 1912.
2 SHEETS—SHEET 1.
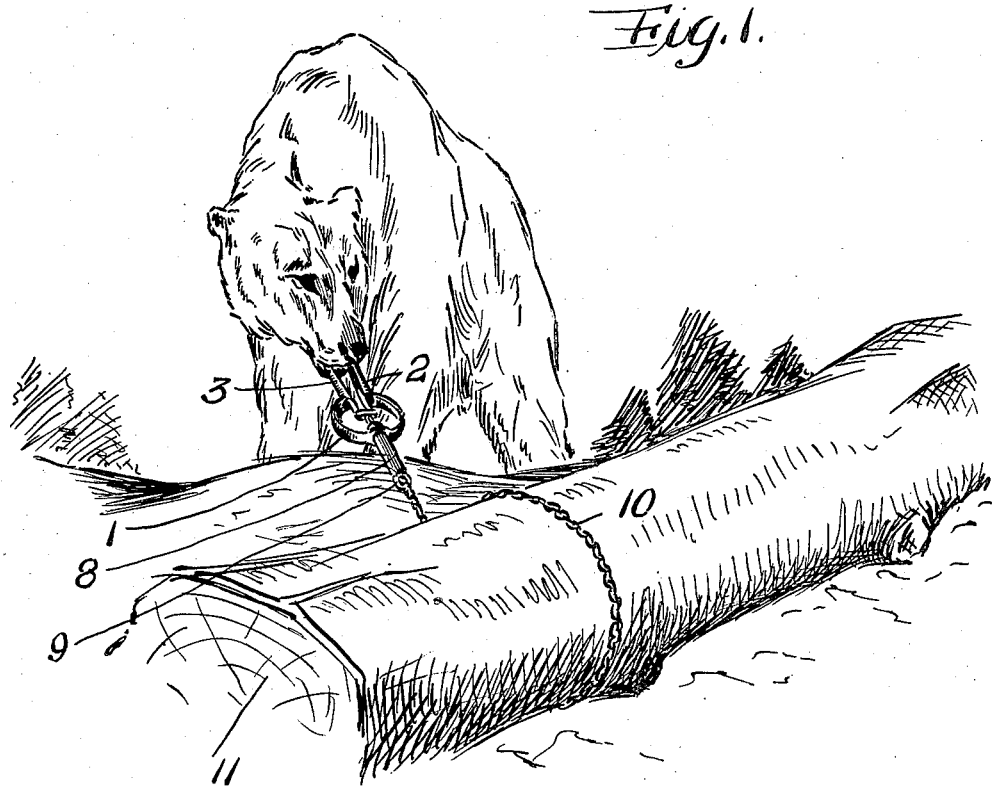
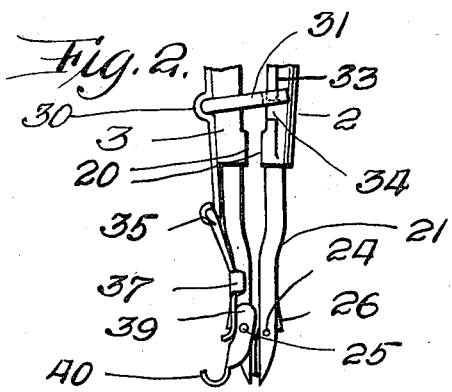
WITNESSES
Samuell Payne
Ralph C. Evert.
INVENTOR
M. Klobusiak.
BY
ATTORNEYS
COLUMBIA PLANOGRAPH CO., WASHINGTON, D. C.

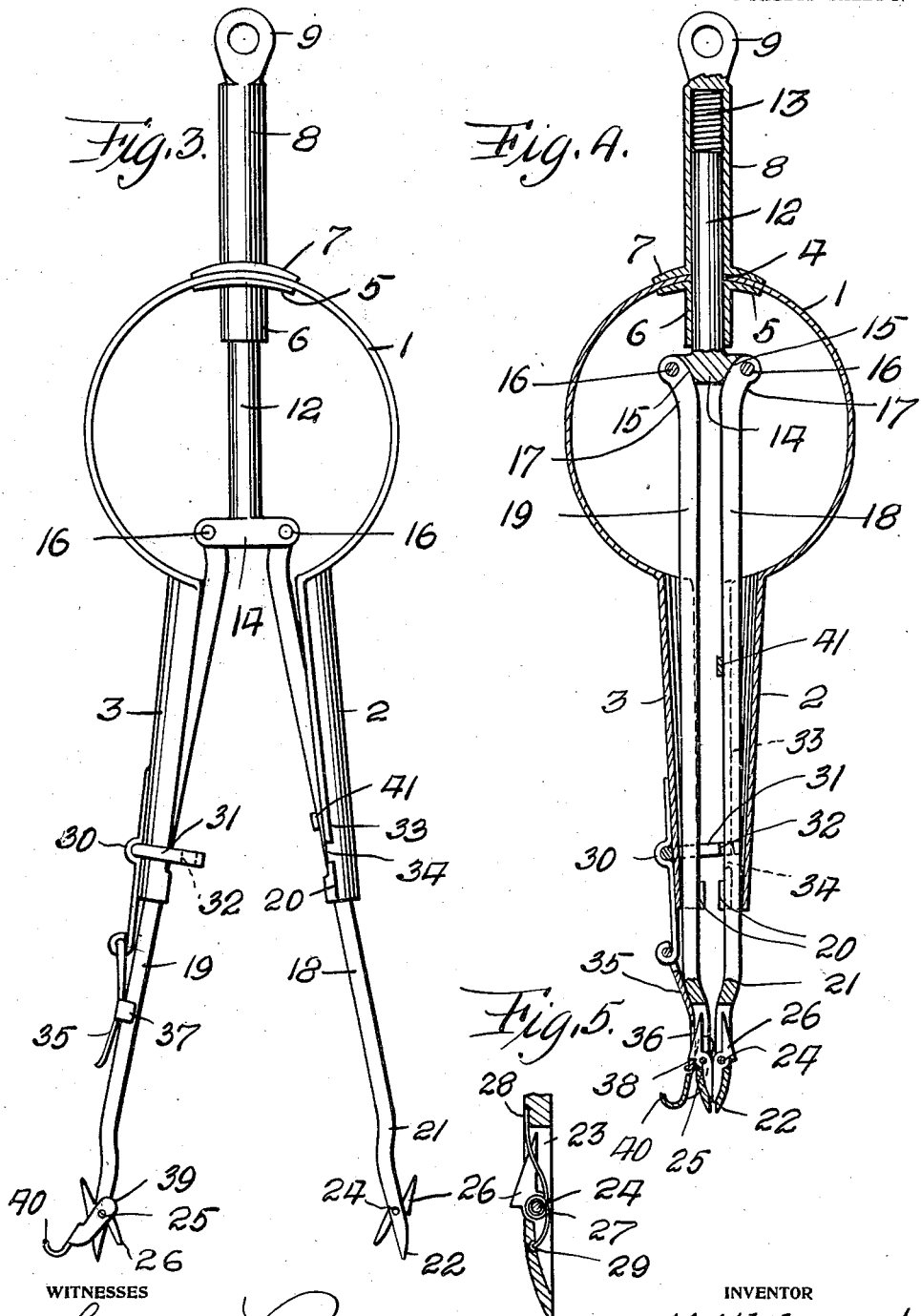

UNITED STATES PATENT OFFICE.

MICHAEL KLOBUSIAK, OF LINWOOD, WEST VIRGINIA.

ANIMAL-TRAP.

1,027,854. Specification of Letters Patent. Patented May 28, 1912.

Application filed December 4, 1911. Serial No. 663,856.

*To all whom it may concern:*

Be it known that I, MICHAEL KLOBUSIAK, a subject of the King of Hungary, residing at Linwood, in the county of Pocahontas and State of West Virginia, have invented certain new and useful Improvements in Animal-Traps, of which the following is a specification, reference being had therein to the accompanying drawing.

This invention relates to an animal trap, and the primary object of my invention is to provide a trap that can be advantageously used for trapping wild animals, as bears and tigers by resorting to the use of a baited trap that is anchored whereby the animal will be held until killed or taken into captivity.

A further object of this invention is to provide a trap embodying spring actuated arms that are held in a closed position by a catch that is released when an animal attempts to remove the bait from the ends of the arms, the ends of the arms being constructed to engage in the mouth and hold the animal until the trap is released.

A further object of this invention is to provide a trap that can be safely handled and arranged in a tree, shrubbery or brush without any suspicion on the part of an animal as to the purpose of the trap.

A still further object of this invention is to provide a strong and durable trap that will withstand the rough usage to which it may be subjected.

With the above and other objects in view, the invention resides in the novel construction, combination and arrangement of parts to be hereinafter specifically described and then claimed.

Reference will now be had to the drawings, wherein:—

Figure 1 is a perspective view of the trap, Fig. 2 is a plan of a portion of the trap in a closed and locked position, Fig. 3 is a plan of the trap in an open position, Fig. 4 is a longitudinal sectional view of the same, and Fig. 5 is an enlarged detail sectional view of a portion of the trap.

A trap in accordance with this invention comprises a band spring 1 having the ends thereof shaped to provide tapering channel arms 2 and 3. The band spring, intermediate the ends thereof, has an opening 4 longitudinally alining with the channels formed by the arms 2 and 3.

Suitably secured to the inner side of the band spring 1, at the opening 4, is the face plate 5 of a tubular guide 6, and suitably secured to the outer side of said spring, at the opening 4, is the face plate 7 of a tubular socket 8. The outer end of said socket terminates in an eye 9 that is attached by a chain 10, cable or other fastening means to a tree 11 or other anchor.

Slidably mounted within the socket 8 and the guide 6 is a rod 12, and arranged within the socket, between the inner end of said rod and the bottom of said socket, is a coiled compression spring 13, the object of which will presently appear. The outer end of the rod 12 has a cross head 14 and the ends of said cross head are bifurcated, as at 15. Pivotally mounted in the bifurcated ends of said head by pins 16 are the curved ends 17 of bars 18 and 19. These bars extend through the channel arms 2 and 3 and are movably held in engagement with the outer ends of said arms by inwardly bent lugs 20 carried by the arms 2 and 3. The bars 18 and 19 gradually taper and are off-set, as at 21 and pointed, as at 22. The pointed ends of said bars are slotted, as at 23 and pivotally mounted in the slots 23 by transverse pins 24 and 25 are double prongs 26. Encircling the pins 24 and 25 are coiled springs 27, one end of each spring being anchored in the end of the bar, as at 28 and the opposite end thereof engaging under one of the prongs as at 29. The tension of the springs 27 is sufficient to swing the double prongs to an open position, as shown in Fig. 3.

The channel arm 3 is provided with a strap 30 and pivotally supported by said strap is a yoke 31 having the ends thereof, at the inner sides, provided with notches 32. The yoke is located adjacent to the end of the arm 3, and the arm 2 has ribs 33 adapted to be engaged by the ends of the yoke 31. The ribs 33 are notched, as at 34 to receive the ends of the yoke and when the yoke is shifted, the walls of the notches 32 engage the ribs 33, as best shown in Fig. 2, said yoke holding the arms in a closed position with the band spring 1 under tension.

Pivotally connected to the strap 30 is a catch 35 having a longitudinal slot 36 and a pair of side arms 37 which straddle the bar 19. When the bars 18 and 19 are closed, as shown in Fig. 4, the forward wall of the slot 36 of the catch 35 is engaged by a shoulder 38 formed on that double prong carried by the bar 19. When the bars 18 and 19 are in the position shown in Fig. 4, the shoulder 38 is in the path of the forward wall of the slot 36 and engages said wall so as to maintain the catch in closed position. Pivotally mounted upon the ends of the pin 25 are the side arms 39 of a bent hook 40, the latter also constituting a trigger. The side arms 39 are in the path of the edges of the catch 35 whereby when the hook 40 is swung inwardly upon the pin 25, the arms 39 will engage the catch 35 and shift it off of the shoulder 38 thereby releasing the catch. When the catch 35 is in engagement with the shoulder 38 the arms are held in a retracted position.

The bar 18, at a point approximately intermediate the ends thereof, is provided with a transverse releasing arm 41.

To set the trap, the rod 12 is pushed into the socket 8 drawing the bars 18 and 19 into the arms 2 and 3 respectively. The shoulder 38 of the double prong of the bar 19 is placed in engagement with the catch 35, said catch holding the bars in their retracted position. The arms 2 and 3 are then pressed together and the yoke 31 placed in engagement with the rib 33. By then holding the arms 2 and 3 a piece of meat or other bait can be placed upon the hook 40 or in some instances upon the pointed ends of the bars 18 and 19. When an animal attempts to obtain the piece of meat or bait, the hook 40 is moved and throws the catch 35 out of engagement with the shoulder 38, thereby releasing the bars 18 and 19. The bars immediately assume an extended position under the action of the spring 13 and as the releasing arm 41 swings the yoke 31, said yoke is shifted toward the notches 34 of the ribs 33 and the arms 2 and 3 released, said arms expanding and supporting the pointed ends of the bars 18 and 19. When the arms 18 and 19 are in a locked position, the double prongs are retained in a closed position, but immediately upon the bars separating by the action of the band spring 1, the double prongs are released and positioned at substantially right angles to the lower ends of the bars 18 and 19. The prongs will engage in the fleshy parts of the mouth of the animal or behind the jaw bones, preventing the animal from escaping, except by tearing the flesh and otherwise injuring itself. After the animal has been muzzled, tied, killed or otherwise rendered harmless, the arms 2 and 3 can be closed and the ends of the bars removed from the mouth of the animal.

The trap is made of strong and durable metal and can be made of various sizes.

What I claim is:—

1. An animal trap comprising a band spring, channel arms carried thereby, bars movably arranged in said arms, double prongs carried by the outer ends of said bars, means carried by one of said arms for holding said arms together with said band spring under tension, a latch carried by one of said arms and engaging with one of said bars for holding said bars in a retracted position, a releasing element for said means carried by one of said bars, and means carried by one of said bars for releasing said latch to free the bars, and means for projecting said bars forwardly when released.

2. An animal trap comprising a band spring, arms carried thereby, spring actuated bars movably arranged in said arms, double prongs pivotally mounted in the outer ends of said bars, means carried by said arms for retaining said arms together with said band spring under tension, an arm carried by one of said bars and capable of engaging with said means for releasing it, a latch carried by one of said arms and engaging with one of said bars for maintaining the bars retracted, and a trigger carried by one of the bars and capable when shifted of engaging said latch to release the same thereby freeing the bars.

3. An animal trap comprising a band spring, arms carried thereby, spring actuated bars movably mounted in said arms, spring actuated double prongs carried by the outer ends of said bars, means including a yoke carried by said arms and adapted to retain said arms together with said band spring under tension, means including a latch carried by one of said arms for holding said bars in a retracted position, and a trigger carried by one of said bars and capable of engaging said latch for releasing it when the trigger is shifted in one direction thereby freeing the bars, and means carried by one of said bars for releasing said arms when said bars are shifted in said arms.

In testimony whereof I affix my signature in the presence of two witnesses.

MIKE KLOBUSIAK.

Witnesses:
O. H. REYNOLDS,
M. C. GATEWOOD.

Copies of this patent may be obtained for five cents each, by addressing the "Commissioner of Patents, Washington, D. C."